(12) United States Patent
Roh (10) Patent No.: US 9,104,203 B2
(45) Date of Patent: Aug. 11, 2015

(54) ROBOT AND METHOD FOR PLANNING PATH OF THE SAME

(75) Inventor: Chang Hyun Roh, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 885 days.

(21) Appl. No.: 13/275,804

(22) Filed: Oct. 18, 2011

(65) Prior Publication Data

US 2012/0143372 A1   Jun. 7, 2012

(30) Foreign Application Priority Data

Dec. 6, 2010   (KR) .......................... 10-2010-0123736

(51) Int. Cl.
*G05B 19/04* (2006.01)
*G05D 1/02* (2006.01)

(52) U.S. Cl.
CPC ............ *G05D 1/0217* (2013.01); *G05D 1/0274* (2013.01); *G05D 1/024* (2013.01); *G05D 1/0242* (2013.01); *G05D 1/0255* (2013.01)

(58) Field of Classification Search
USPC ........................................................... 701/23
See application file for complete search history.

(56) References Cited

U.S. PATENT DOCUMENTS

| | | | | |
|---|---|---|---|---|
| 5,093,256 A | * | 3/1992 | Shen et al. | 435/198 |
| 6,167,332 A | * | 12/2000 | Kurtzberg et al. | 701/23 |
| 2004/0117079 A1 | * | 6/2004 | Hulden | 701/23 |
| 2005/0131581 A1 | * | 6/2005 | Sabe et al. | 700/245 |
| 2006/0149465 A1 | * | 7/2006 | Park et al. | 701/209 |

* cited by examiner

*Primary Examiner* — Thomas G Black
*Assistant Examiner* — Wae Louie
(74) *Attorney, Agent, or Firm* — Harness, Dickey & Pierce, PLC (57) ABSTRACT

A robot and a method for planning a path of the robot. The method includes storing coordinates of a base cell in a queue structure, setting a plurality of cells adjacent to the base cell as scan cells, calculating a movement direction of the robot from the base cell to each of the scan cells, calculating movement cost of each of the scan cells according to the calculated movement direction, comparing the calculated movement cost and movement cost previously stored in each of the scan cells and determining whether or not coordinates of each of the scan cells are stored in the queue structure, and repeatedly performing a process of recording the movement direction and the movement cost in each of the scan cells and building a map of the movement space of the robot if the coordinates of each of the scan cells are stored in the queue structure.

21 Claims, 11 Drawing Sheets

| VALID_E | VALID_W | VALID_S | VALID_N | WALL_E | WALL_W | WALL_S | WALL_N |

ROBOT AND METHOD FOR PLANNING PATH OF THE SAME

This application claims the benefit of Korean Patent Application No. 2010-123736, filed on Dec. 6, 2010 in the Korean Intellectual Property Office, the disclosure of which is incorporated herein by reference.

BACKGROUND

1. Field

Embodiments relate to a robot and a method for planning a path of the same, which are capable of enabling the robot to move to a goal position along the shortest path possible using a grid map.

2. Description of the Related Art

In general, a mechanical device which performs motion similar to human motion using an electrical or magnetic mechanism is called a robot.

Recently, with advances in sensor and controller technology, the robot has been utilized in various fields. For example, there are a household robot, a guide robot of a public place, a transportation robot of a manufacturing plant and an operator assisting robot.

In order to enable such a robot to move in an actual environment, there is a need for a process of recognizing the position of the robot, building a map, and planning a path to a goal position.

The method for planning the path of the robot has various requirements such as obstacle avoidance and a short movement distance to a goal position.

The obstacle may or may not be recognized by the robot in advance.

Therefore, in order to plan a path along which a robot moves to a goal position over the shortest distance possible while avoiding an obstacle, there is a need for a method of building a grid map of a space in which a robot is located.

SUMMARY

Therefore, it is an aspect of an embodiment to provide a robot and a method for planning a path of the robot, which calculates a movement path of the robot based on a grid map built by repetition of a process of searching for a plurality of cells from a goal point set in any one of a plurality of cells configuring a movement space of the robot and recording movement directions and movement costs of the searched cells and updating obstacle information while the robot moves along the calculated movement path.

Additional aspects of embodiments will be set forth in part in the description which follows and, in part, will be obvious from the description, or may be learned by practice of embodiments.

In accordance with an aspect of an embodiment, there is provided a method for planning a path of a robot, including setting any one of a plurality of cells configuring a space in which the robot moves and storing coordinates of the base cell in a queue structure, searching for and setting a plurality of cells adjacent to the base cell as scan cells, calculating a movement direction of the robot from the base cell to each of the scan cells, calculating a movement cost of each of the scan cells according to the calculated movement direction, comparing the calculated movement cost and movement cost previously stored in each of the scan cells and determining whether or not coordinates of each of the scan cells are stored in the queue structure, and repeatedly performing a process of recording the movement direction and the movement cost in each of the scan cells and building a map of the movement space of the robot if the coordinates of each of the scan cells is stored in the queue structure.

The method may further include calculating a movement path of the robot based on the built map, and updating obstacle information while moving the robot along the calculated movement path.

The coordinates of each of the scan cells may be stored in the queue structure if the calculated movement cost is less than the movement cost previously stored in each of the scan cells.

The building of the map may be repeated until the coordinates of the cell are not present in the queue structure.

The queue structure may be of a First-In First-Out (FIFO) type.

The movement direction may include a primary movement direction for moving the robot from the base cell to the scan cell, and a secondary movement direction for moving the robot from a cell preceding the base cell to the base cell.

The movement cost may be calculated by selecting any one of a diagonal weight, a straight weight and a rotation weight according to the calculated movement direction and adding the selected weight to the movement cost of the base cell.

The weight may be selected by comparing a primary movement direction and a secondary movement direction of each of the scan cells with a primary movement direction and a secondary movement direction of the base cell.

The selecting of the weight may include selecting the diagonal weight if the primary movement direction of each of the scan cells coincides with the secondary movement direction of the base cell, selecting the straight weight if the primary movement direction of each of the scan cells coincides with the primary movement direction of the base cell, and selecting the rotation weight if the movement direction of each of the scan cells does not coincide with the movement direction of the base cell.

A goal point of the robot may be initially set as the base cell.

If the goal point is set to the base cell, the movement cost of the base cell which is the goal point may be set to a predetermined value, the primary movement direction and the secondary movement direction may be set to all directions of up, down, left and right, and the set movement cost and movement direction may be stored in the cell.

The method may further include determining whether or not an obstacle is present in the cell in which the robot is located while the robot moves and updating obstacle information related to the location of the obstacle, and determining whether or not the map needs to be rebuilt based on the updated obstacle information.

The obstacle information may include position information of the obstacle in the cell, and validity information indicating whether or not the position information of the obstacle is valid by directly sensing the obstacle.

In accordance with another aspect of an embodiment, there is provided a robot including: a driving unit configured to move the robot along a movement path; a sensor configured to sense an obstacle near the robot driven by the driving unit; and a map builder configured to set any one of a plurality of cells configuring a space in which the robot moves and store coordinates of the base cell in a queue structure, search for and set a plurality of cells adjacent to the base cell as scan cells, calculate a movement direction of the robot from the base cell to each of the scan cells, differently calculate movement cost of each of the scan cells according to the calculated movement direction, compare the calculated movement cost and movement cost previously stored in each of the scan cells and determine whether or not coordinates of each of the scan cells is stored in the queue structure, and repeatedly perform a process of recording the movement direction and the movement cost in each of the scan cells and building a map of the movement space of the robot if the coordinates of each of the scan cells is stored in the queue structure.

The map builder may store coordinates of each of the scan cells in a First-In First-Out queue structure if the calculated movement cost is less than movement cost previously stored in each of the scan cells.

The map builder may build the map until the coordinates of the cell are not present in the queue structure.

The map builder may calculate a primary movement direction for moving the robot from the base cell to the scan cell, and a secondary movement direction for moving the robot from a cell preceding the base cell to the base cell.

The map builder may calculate the movement cost of each of the scan cells by selecting any one of a diagonal weight, a straight weight and a rotation weight according to the calculated movement direction and adding the selected weight to the movement cost of the base cell.

The map builder may select the diagonal weight if the primary movement direction of each of the scan cells coincides with the secondary movement direction of the base cell, select the straight weight if the primary movement direction of each of the scan cells coincides with the primary movement direction of the base cell, and select the rotation weight if the movement direction of each of the scan cells does not coincide with the movement direction of the base cell.

The robot may further include a goal point setting unit configured to set a goal point of the robot, and the map builder may initially set the goal point set by the goal point setting unit as the base cell, The robot may further include a movement calculator configured to calculate a movement path of the robot based on the map built by the map builder, and an obstacle information updating unit configured to update obstacle information sensed by the sensor while moving the robot along the movement path calculated by the movement path calculator.

The obstacle information updating unit may determine whether or not the map needs to be rebuilt if the obstacle information is updated, and the map builder may rebuild the map based on the updated obstacle information if it is determined that the map needs to be rebuilt.

The obstacle information updating unit may update position information of the obstacle in the cell and validity information indicating whether or not the position information of the obstacle is valid by directly sensing the obstacle.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout.

Figure 1:
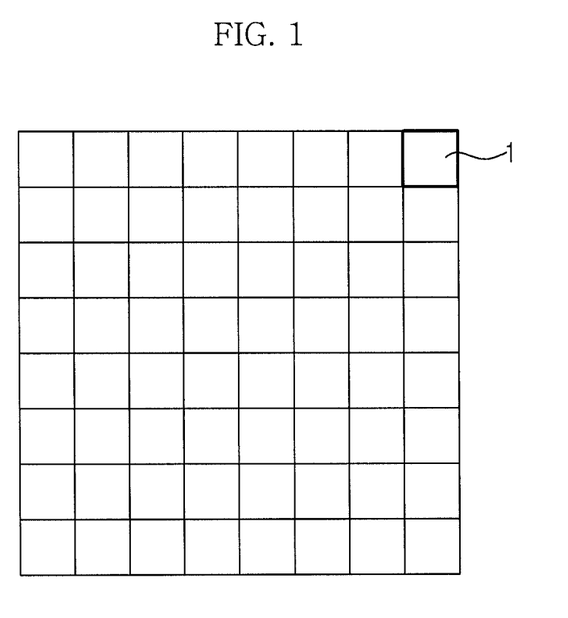
FIG. 1 is a diagram showing a grid map of a movement space of a robot according to an embodiment.

FIG. 1 is a diagram showing a grid map of a movement space of a robot according to an embodiment.

An algorithm for planning a movement path of a robot using a grid map sets a movement path in units of cells 1 and enables the robot to move on a per cell basis.

Hereinafter, a robot and a method for planning a path of the robot, which builds a map using the grid map shown in FIG. 1 and enables the robot to move to a goal point along a shortest path using the map, will be described in detail.

Figure 2:
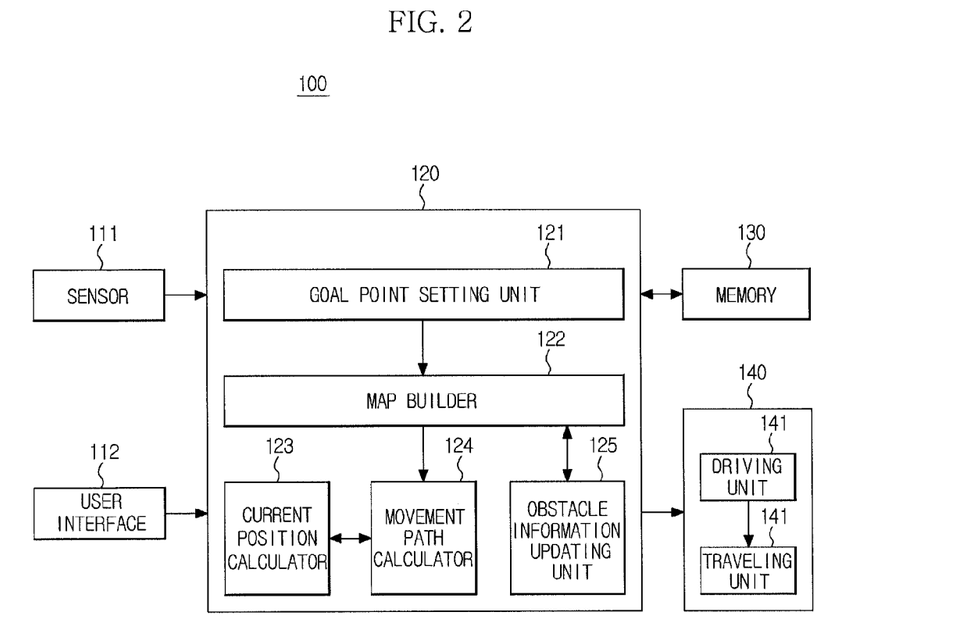
FIG. 2 is a block diagram showing a robot according to an embodiment.

FIG. 2 is a block diagram showing a robot according to an embodiment.

The robot 100 according to the present embodiment includes a sensor 111, a user interface 112, a controller 120, a memory 130 and a movement unit 140.

The sensor 111 includes an ultrasonic sensor, an infrared sensor, a laser sensor, etc. and is mounted in the robot 100 which moves along a movement path so as to sense a peripheral obstacle upon movement.

That is, the sensor 111 senses whether or not an obstacle is present in a cell in which the robot 100 is located and the position of an obstacle.

The sensor may sense whether or not an obstacle is present, by sending an ultrasonic signal or an infrared signal and computing a time of arrival (TOA) of a returning signal.

The presence/absence of the obstacle and the position of the obstacle are transmitted to the controller 120 such that obstacle information is updated in real time.

The user interface 112 is used to input information about a space in which the robot 100 moves. The user interface 112 may receive the position of an obstacle recognized by a user and a final position of the robot.

The controller 120 builds a map based on the information about the movement space of the robot 100 received through the user interface 112, calculates a movement path, and transmits the movement path to the movement unit 140. While moving, a determination as to whether or not the map is rebuilt is made based on the information about the obstacle received through the sensor 111.

The controller 120 includes a goal point setting unit 121, a map builder 122, a current position calculator 123, a movement path calculator 124 and an obstacle information updating unit 125.

The goal point setting unit 121 sets a goal point in the grid map based on the final position of the robot received through the user interface 122.

If the goal point is set, the goal point setting unit 121 initializes all cells configuring the grid map. That is, the goal point setting unit sets movement costs of all cells configuring the grid map to predetermined values. The predetermined values may be a largest value which may be stored as the movement cost of the cell.

Figure 3:
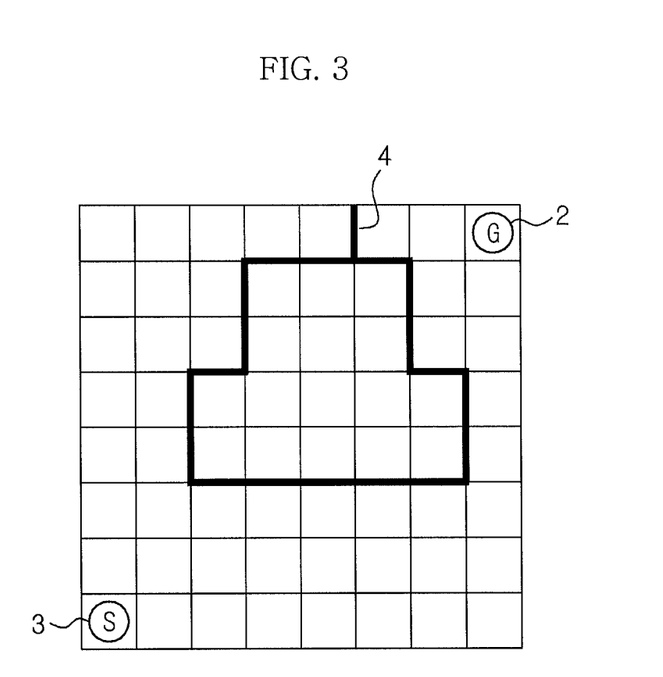
FIG. 3 is a diagram showing a state in which a goal point and a current position of a robot are set in a grid map of a movement space of the robot.

FIG. 3 is a diagram showing a state in which a goal point and a current position of a robot are set in a grid map of a movement space of the robot.

Referring to FIG. 3, in the grid map built based on the information about the movement space of the robot received through the user interface, the current position 3 of the robot, which is calculated by the current position calculator, and the goal point 2 set by the goal point setting unit are displayed.

That is, a plurality of cells configuring the movement space of the robot, the movement costs of which are initialized, is present in the initial grid map before the map is built. The current position 3 and the goal point 2 of the robot are displayed in the plurality of cells and obstacle information 4 recognized by the user in advance is stored.

The map builder 122 computes the movement direction and the movement cost of each of the cells configuring the grid map and builds the map of the movement space of the robot.

That is, the map builder 122 repeatedly performs a process of calculating and recording movement information including the movement cost and the movement direction from the cell set as the goal point in the initial grid map shown in FIG. 3 so as to build the map.

The movement direction is calculated in consideration of the positions of a current cell (scan cell) and a base cell which is a cell preceding the scan cell.

That is, the movement direction is information about a primary movement direction from the base cell to the scan cell and a secondary movement direction from a cell preceding the base cell to the base cell.

The calculated movement direction is stored in the scan cell in a predetermined form, which will be described in detail with reference to FIG. 4.

Figure 4:
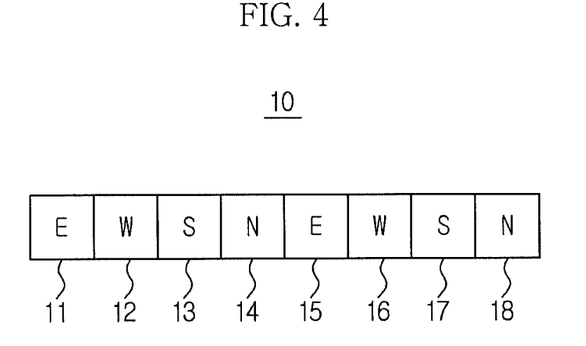
FIG. 4 is a diagram showing movement direction information stored in each cell of the grid map of FIG. 3.

FIG. 4 is a diagram showing movement direction information stored in each cell of the grid map of FIG. 3.

Referring to FIG. 4, the movement direction information 10 has a size of 1 byte, in which the information about the secondary movement direction to the base cell is recorded in high-order 4 bits 11, 12, 13 and 14 and the information about the primary movement direction to the scan cell is recorded in low-order 4 bits 15, 16, 17 and 18.

Each of the four bits has 1 or 0 as absolute direction information of east (11 and 15), west (12 and 16), south (13 and 17) or north (14 and 18).

For example, if the scan cell is located on the left side of the base cell, the primary movement direction to the scan cell is west and the low-order 4 bit value is recorded as "0100".

The absolute direction arrangement order of the 4 bits shown in FIG. 4 is only exemplary (in the present embodiment, east, west, south and north are sequentially arranged), and the absolute direction arrangement direction may be changed.

The movement cost is a value necessary to find a shortest distance from each cell to a cell set as the goal point and is set in consideration of a distance from the goal point and a movement direction to the goal point.

The movement cost is calculated by adding the weight to the movement cost of the base cell.

The weight includes a diagonal weight, a straight weight and a rotation weight and is differently selected according to the calculated movement direction.

Specifically, the map builder 122 determines whether or not the movement direction of the scan cell matches the movement direction of the base cell, selects any one of the diagonal weight, the straight weight and the rotation weight according to the determination result, and adds the selected weight to the movement cost of the base cell.

The map builder 122 calculates movement information in order of cells adjacent to the goal point and records the movement information in each cell, thereby building the grid map. The method of building the map will be described in detail with reference to FIGS. 6 to 11.

The current position calculator 123 calculates at which position the robot 100 is located in the grid map. That is, the current position calculator 123 calculates the coordinates of the cell in which the robot 100 is currently located and transmits the coordinates to the memory 130.

The current position of the robot 100 may be computed by receiving the movement distance and direction from the movement unit 140. Specifically, the current position calculator 123 counts the number of times of rotation of a traveling unit 142 and multiplies the number of times of rotation by the diameter of the traveling unit 142, thereby computing the rough movement distance of the robot 100. The current position calculator 123 counts the number of times of rotation of the driving unit 141 and calculates a more accurate movement distance using a steering angle, in order to finely adjust the calculated movement distance of the robot 100.

That is, the current position calculator 123 calculates the substantial movement distance of the robot 100 using the number of times of rotation of the traveling unit 142 and the number of times of rotation and the steering angle of the driving unit 141 received from the movement unit 140 and calculates the coordinates of the cell, in which the robot 100 is currently located, using the calculated movement distance.

The movement path calculator 124 calculates the movement path of the robot 100 based on the grid map built by the map builder 122.

The movement path calculator 124 repeatedly performs a process of selecting a cell having the lowest movement cost from among cells adjacent to the current position of the robot 100 as a cell, to which the robot will move, sets the inverse direction of the movement direction recorded in the cell, to which the robot will move, as the movement direction of the robot 100 and calculates a shortest movement path of the robot 100.

The obstacle information updating unit 125 updates information about an obstacle sensed while the robot 100 moves along the movement path calculated by the movement path calculator 124.

Specifically, the obstacle information updating unit 125 determines whether or not an obstacle is present in the cell in which the robot 100 is located, compares information about the position of the obstacle with obstacle information stored in the memory 130 if the obstacle is present, and updates the obstacle information.

The obstacle information stored in the memory 130 will be described in detail with reference to FIG. 5.

Figure 5:
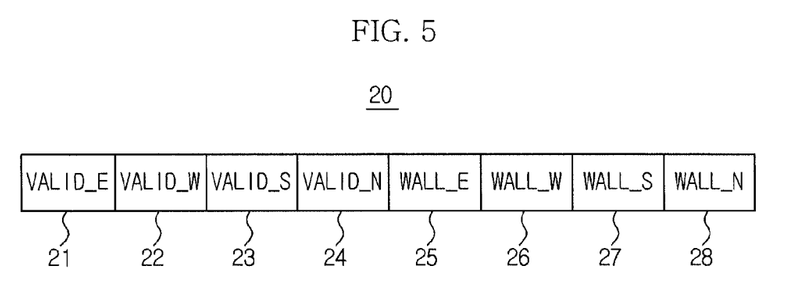
FIG. 5 is a diagram showing obstacle information stored in each cell of the grid map of FIG. 3.

FIG. 5 is a diagram showing obstacle information stored in each cell of the grid map of FIG. 3.

Referring to FIG. 5, obstacle information 20 has a size of 1 byte, in which validity information indicating whether or not the position information of the obstacle is valid by directly sensing the obstacle by the robot is recorded in 4 high-order bits 21, 22, 23 and 24 and position information which is absolute direction (east, west, south and north) information indicating where the obstacle is located in the cell is recorded in low-order 4 bits 25, 26, 27 and 28.

The validity information 21, 22, 23 and 24 indicates whether or not the previously stored position information of the obstacle is valid, as the result of sensing the obstacle by the robot. If it is sensed that the position information of the obstacle is valid by directly sensing the obstacle by the robot, "1" is recorded and, if not, "0" is recorded.

The position information 25, 26, 27 and 28 indicates whether the obstacle is present in the east 25, the west 26, the south 27 or the north 28. If the obstacle is present, "1" is recorded and, if the obstacle is not present, "0" is recorded.

Although the absolute directions are arranged in order of the east, the west, the south and the north in the present embodiment, the absolute direction arrangement order may be changed.

That is, the obstacle information updating unit 125 updates the previously stored obstacle information of FIG. 4 using the information about the obstacle acquired by the movement of the robot between cells.

For example, in the obstacle information stored in the current cell in which the robot is located, if an obstacle is located in the north in which validity is not verified, the validity information is "0000" and the position information is "0001".

If obstacles are sensed in the south and the north of the current cell as the result of sensing the obstacle by the robot, the validity information is updated to "1111" and the position information is updated to "0011". The updated information is stored in the memory 130.

The obstacle information updating unit 125 updates the obstacle information based on the sensed obstacle and determines whether or not the previously built map needs to be rebuilt.

That is, if the result of updating the obstacle information is different from the previously stored obstacle information, since the map is built based on inaccurate obstacle information, the obstacle information updating unit 125 controls the map builder to rebuild the map based on the updated obstacle information.

The memory 130 stores the coordinates of the cells configuring the grid cell. The information about the movement directions and the movement costs of the cells calculated by the map builder 122 is stored along with the coordinates of the cells.

The memory 130 stores the obstacle information received through the user interface 112 and updates the stored obstacle information based on the signal received from the obstacle information updating unit 125.

The movement unit 140 moves the robot 100 based on the movement path generated by the movement path calculator 124.

The movement unit 140 includes the driving unit 141 to generate power and the traveling unit 142 to move the robot using the generated power.

The driving unit 141 sends power to the traveling unit 142 and controls a movement direction. The driving unit 141 may include a motor driven by power from an energy source.

The traveling unit 142 includes a wheel, a cantilever, or two legs or multiple legs used for walking of the robot 100 and serves to move the robot 100.

Figure 6:
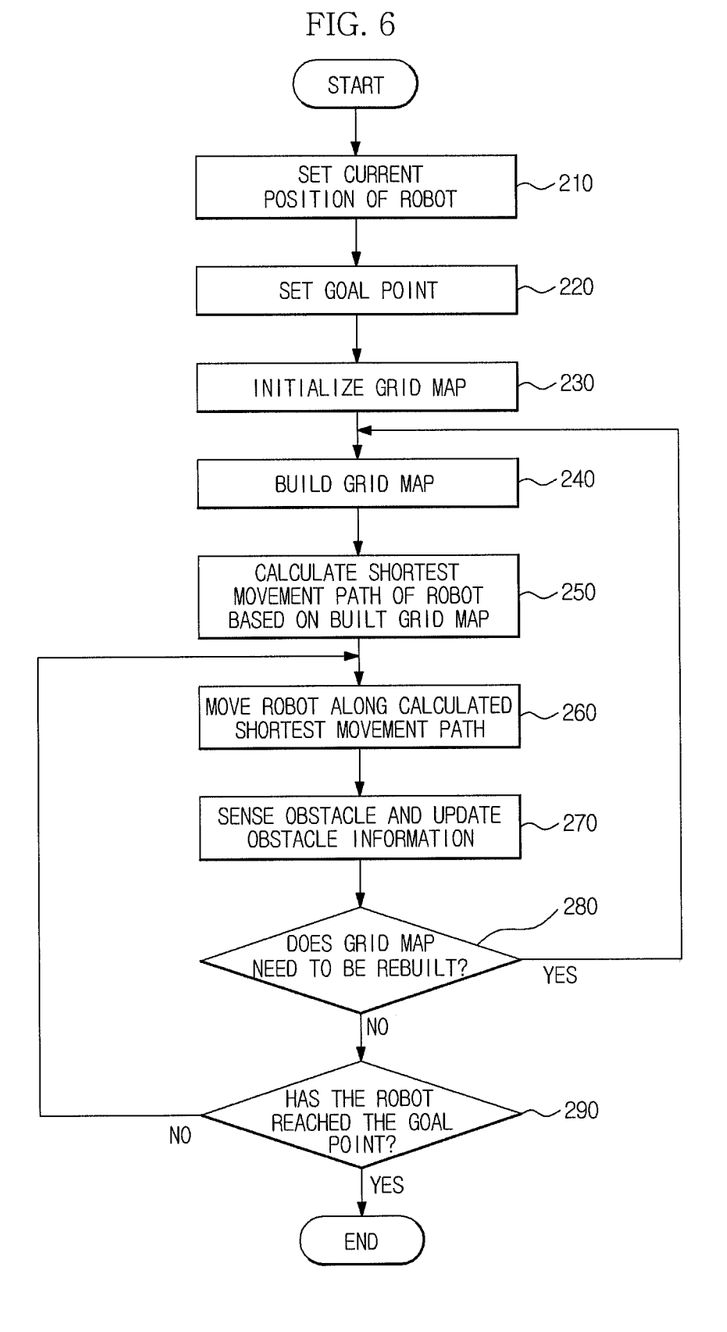
FIG. 6 is a flowchart illustrating a method for planning a path of a robot according to another embodiment.

FIG. 6 is a flowchart illustrating a method for planning a path of a robot according to another embodiment.

Referring to FIG. 6, first, the current position of the robot calculated by the current position calculator is set on the grid map (210).

If the current position of the robot is set (210), the goal point setting unit sets the goal point on the grid map based on the final position of the robot received through the user interface (220).

If the goal point is set (220), the goal point setting unit initializes the movement costs of all the cells configuring the grid cell to predetermined values (230).

If the goal point is set and the grid map is initialized (220 and 230), the map builder repeatedly performs the process of calculating the movement costs and the movement directions from the cells adjacent to the goal point and recording the movement costs and the movement directions so as to build the grid map configuring the movement space of the robot (240).

Specifically, the map builder repeatedly performs a process of searching for cells adjacent to the cell whose movement information including the movement direction and the movement cost is already calculated, and calculating movement information with respect to the searched cells.

A cell whose movement information is already calculated is defined as a base cell and a cell which is adjacent to the base cell and whose movement information will be calculated is defined as a scan cell.

That is, the base cell is a preceding cell used to calculate the movement information of the scan cell.

The movement direction includes information about a primary movement direction from the base cell to the scan cell and information about a secondary movement direction from the cell preceding the base cell to the base cell.

That is, the movement direction information of the scan cell includes the position information of the scan cell from the base cell (the primary movement direction of the scan cell) and the primary movement direction (the secondary movement direction of the scan cell) of the movement direction information of the base cell.

The calculated movement direction information of the scan cell is used to calculate the movement cost. Specifically, the movement cost of the scan cell is calculated by adding the weight to the movement cost of the base cell.

The weight includes a diagonal weight, a straight weight and a rotation weight and has a relationship of diagonal weight<straight weight<rotation weight. In movement between cells, movement distance is shortest when the robot moves in a diagonal direction and movement distance is longest when the robot rotates at a right angle.

The movement cost of the scan cell is calculated by comparing the calculated movement direction information of the scan cell and the previously stored movement direction information of the base cell and adding any one of the diagonal weight, the straight weight and the rotation weight to the movement cost of the base cell.

In the present embodiment of calculating the movement cost in consideration of the movement direction, since the movement direction is considered, it is possible to obtain the movement cost with higher precision as compared to the related art in which the movement cost is calculated based only upon a distance from a goal point.

If the movement information is calculated and the map is built using the above-described method, the movement path calculator calculates the shortest movement path of the robot based on the built grid map (250).

The movement path calculator searches for cells adjacent to the current position of the robot and selects a cell having lowest movement cost from among the searched adjacent cells. The movement path calculator sets a direction in which the robot will move from the current position to the selected cell based on the movement direction information previously stored in the selected cell. Specifically, the movement path calculator sets the inverse direction of the movement direction recorded in the cell, to which the robot will move, as the movement direction of the robot between the cells.

In this way, the shortest movement path to the goal point is calculated by repeatedly deciding the cell to which the robot will move from the current position thereof and the movement direction between the cells.

If the movement path is calculated (250), the movement unit moves the robot along the calculated movement path (260) and the obstacle information updating unit updates the previously stored obstacle information based on the obstacle present in the current cell sensed by the sensor (270).

Specifically, the obstacle information updating unit updates the previously updated obstacle information to the obstacle information acquired while the robot moves between cells.

For example, although the obstacle information previously stored in the cell in which the robot is currently located indicates that an obstacle is present in the north, if the robot senses that an obstacle is present to the west, the obstacle information updating unit updates the previously stored obstacle information to information indicating that the obstacle is present to the west.

The obstacle information updating unit updates the obstacle information (270) and then determines whether or not the grid map built by the map builder needs to be rebuilt (280).

If the previously stored obstacle information is different from the sensed obstacle information, since the grid map is built based on incorrect obstacle information, the grid map is rebuilt based on the updated obstacle information.

That is, the obstacle information updating unit determines that the grid map needs to be rebuilt if information different from the previously stored obstacle information is updated and transmits a signal to rebuild the grid map to the map, builder (280).

If the signal to rebuild the grid map is received from the obstacle information updating unit, the map builder rebuilds the grid map based on the updated obstacle information.

If the grid map does not need to be rebuilt, the movement unit moves the robot along the movement path until the goal point (290) is reached.

According to the method for planning the path of the robot of the present embodiment, the process of recording the information about the movement directions and the movement costs in order of cells adjacent to the goal point is repeatedly performed so as to build the grid map and the robot moves to the goal point along a shortest path by using the built grid map.

By calculating the movement direction and then differently calculating the movement cost based on the movement direction, it is possible to acquire a grid map with higher accuracy.

Since the obstacle information is updated according to the movement of the robot and the grid map is rebuilt based on the updated obstacle information, the robot may move to the goal point while avoiding an obstacle.

Hereinafter, the process of building the grid map will be described in detail with reference to FIGS. 7 to 11.

Figure 7:
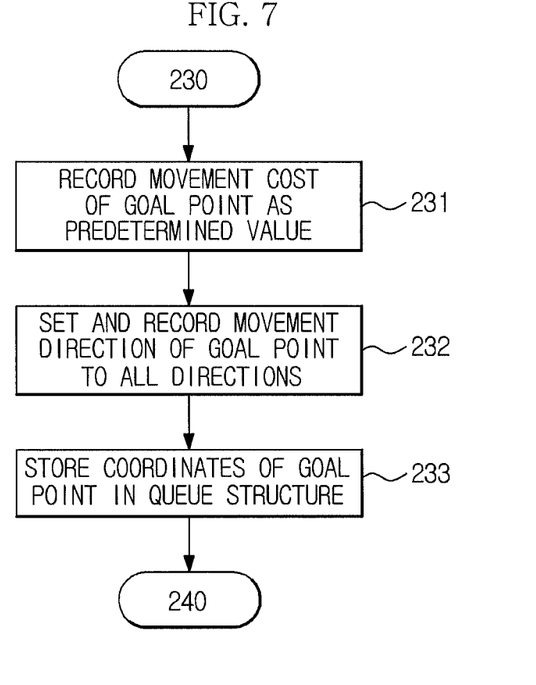
FIG. 7 is a flowchart illustrating a process of setting a goal point of FIG. 6 in detail.

FIG. 7 is a flowchart illustrating a process between an operation for setting the goal point and an operation for building the grid map of FIG. 6 in detail.

FIG. 7 shows a process of recording movement information of the goal point in order to record movement information of cells adjacent to the goal point.

Specifically, first, the map builder records the movement cost of the cell of the goal point as a predetermined value (231).

In the present embodiment, the predetermined value is "0". Alternatively, the predetermined value may be a small non-zero value.

When the movement cost is recorded (231), the map builder sets and records the movement direction of the goal point to all directions (232), because the recording of the movement information begins at the goal point and thus the base cell which is the preceding cell of the goal point is not present.

Figure 8:
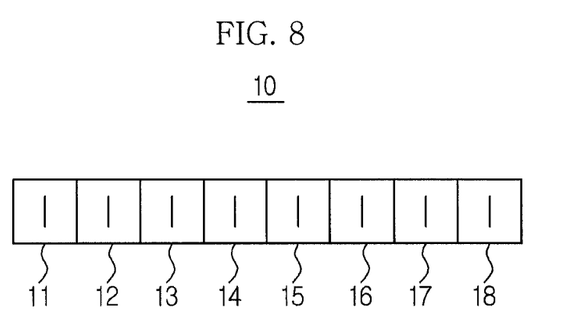
FIG. 8 is a diagram showing movement direction information stored in a cell of a goal point.

FIG. 8 is a diagram showing movement direction information 10 stored in a cell containing the goal point. Both the primary movement information and the secondary movement direction are set to "1111", that is, the movement direction is set to all directions.

If the movement information of the goal point is recorded (231 and 232), the map builder stores the coordinate value of the cell set as the goal point in a queue structure (233).

The queue structure is a First-In First-Out (FIFO) type data structure. The map builder repeats a process of storing the coordinate value of a cell in the queue structure, setting a cell corresponding to the stored coordinates as the base cell, and recording movement information of scan cells adjacent to the base cell.

Hereinafter, the process of recording the movement information of the cells adjacent to the goal point using the queue structure will be described.

Figure 9:
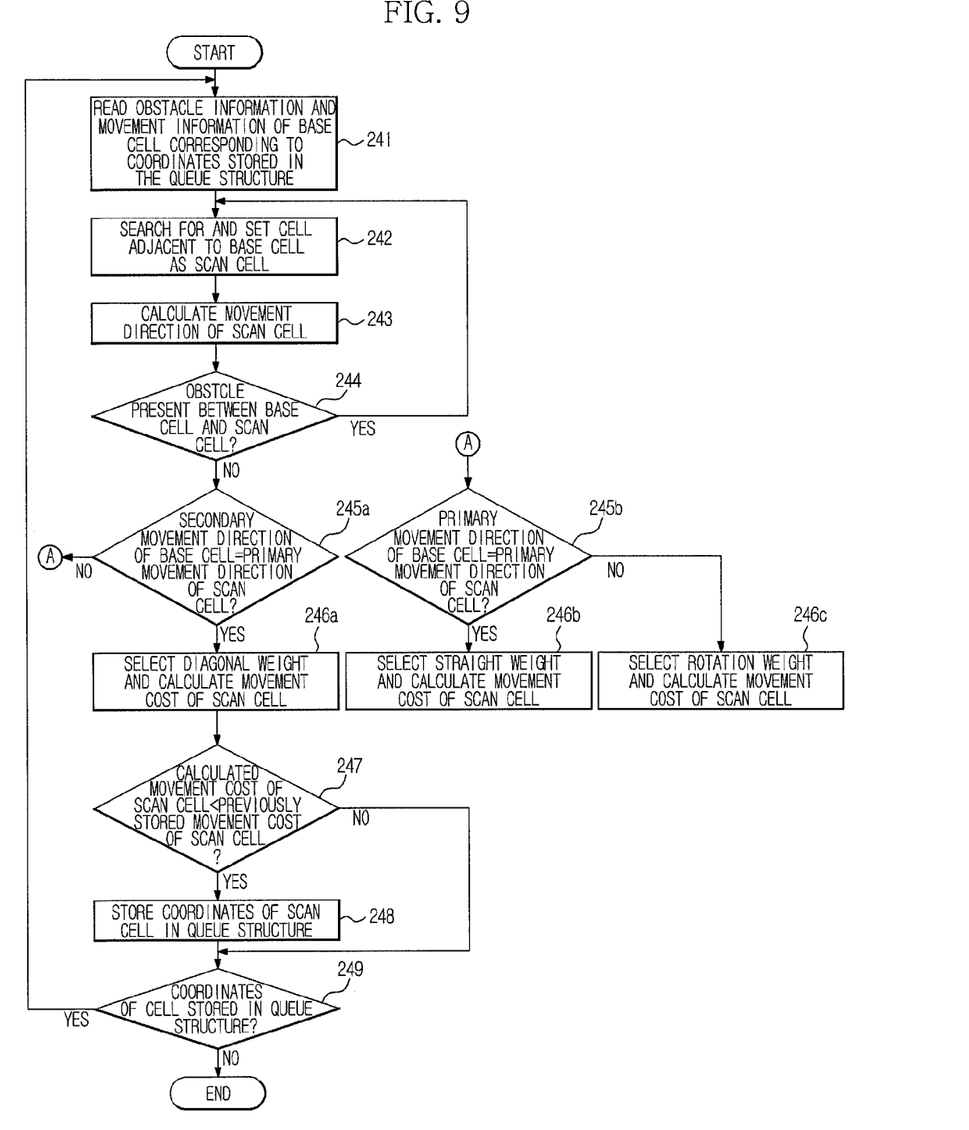
FIG. 9 is a flowchart illustrating a process of building a grid map of FIG. 6 in detail.

FIG. 9 is a flowchart illustrating the process of building the grid map of FIG. 6 in detail.

Referring to FIG. 9, first, the obstacle information and the movement information (movement direction and movement cost) of the base cell corresponding to the coordinates stored in the queue structure are read (241).

When the information of the base cell is read (241), a cell adjacent to the base cell is searched for, the searched cell is set as the scan cell (242) and the movement direction (primary movement direction and secondary movement direction) of the set scan cell is calculated (243).

Once the movement direction is calculated (243), it is determined whether or not an obstacle is present between the base cell and the scan cell based on the obstacle information of the base cell (244). If it is determined that an obstacle is present, the robot cannot move from the base cell to the scan cell and thus another cell is searched for.

If an obstacle is not present between the base cell and the scan cell, a weight is selected based on the movement direction information of the base cell and the scan cell.

Specifically, if the secondary movement direction of the base cell coincides with the primary movement direction of the scan cell (245a), the movement direction to the scan cell is a diagonal direction and thus a diagonal weight is selected. In addition, the selected weight is added to the movement cost of the base cell so as to calculate the movement cost of the scan cell (246a).

If the primary movement direction of the base cell coincides with the primary movement direction of the scan cell (245b), the movement direction to the scan cell is straight and thus a straight weight is selected. The selected weight is added to the movement cost of the base cell (246b).

If the movement directions of the base cell and the scan cell do not coincide, the movement direction to the scan cell is a right-angle direction and thus a rotation weight is selected. The selected weight is added to the movement cost of the base cell so as to calculate the movement cost of the scan cell (246c).

Once the movement cost of the scan cell is calculated (246a, 246b and 264c), the map builder compares the previously stored movement cost and the calculated movement cost of the scan cell (247).

If the calculated movement cost is less than the previously stored movement cost (247), the movement information of the scan cell is recorded and the coordinates is stored in the queue structure (248). Then, the scan cell is set to the base cell, a cell adjacent to the scan cell is searched for, and the movement information of the searched cell is recorded.

If the calculated movement cost is equal to or greater than the previously stored movement cost, the movement direction of the scan cell alone is recorded.

The above-described process of recording the movement information of the cells configuring the movement space of the robot is repeated while the coordinates of the cell are stored in the queue structure. If the coordinates of the cell are not stored in the queue structure, the process of building the grid map is completed (249).

Up to now, the process of repeatedly recording the movement information of the cells configuring the movement space of the robot using the queue structure has been described. Hereinafter, the above-described process will be described with reference to FIGS. 10 and 11.

Figure 10:
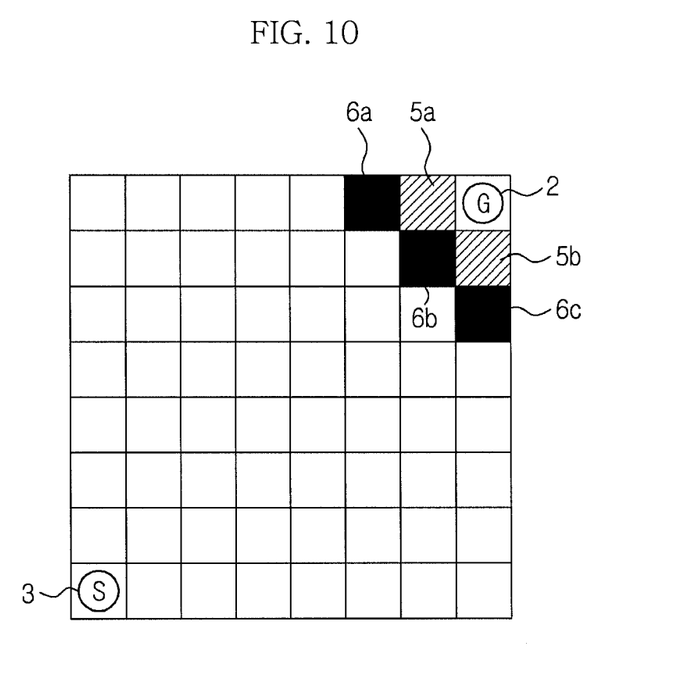
FIG. 10 is a diagram showing an example of building a grid map using the process shown in FIG. 9.
Figure 11:
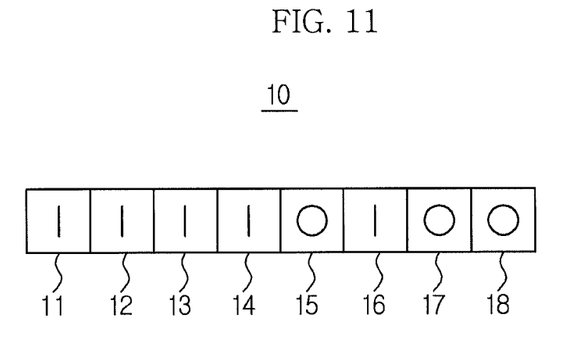
FIG. 11 is a diagram showing an example of a movement direction recorded in a scan cell of FIG. 10.

First, it is assumed that the movement cost of the goal point is "0", the diagonal weight is "2", the straight weight is "4", the rotation weight is "8", and, for convenience, an obstacle is not present between cells.

FIGS. 10 and 11 are diagrams showing examples of the result of recording the movement information of the scan cells adjacent to the goal point using the goal point as the base cell.

Referring to FIG. 10, the goal point 2 is stored in the queue structure and the movement information of the goal point 2 is read using the goal point 2 as the base cell. The first and second movement directions of the goal point 2 are all directions and the movement cost is "0".

First, scan cells 5a and 5b adjacent to the goal point 2 which is the base cell are searched for and the movement directions of the scan cells are calculated.

Specifically, since the scan cell 5a located on the left side of the goal point is present to the west of the goal point 2, the primary movement direction is west and the secondary movement direction is forward. This secondary movement direction coincides with the primary movement direction of the base cell.

The calculated movement direction information of the scan cell is shown in FIG. 9. Since the primary movement direction is west, the low-order 4 bits 15, 16, 17 and 18 are set to "0100" and, since the secondary movement direction is all directions, the high-order 4 bits 11, 12, 13 and 14 are set to "1111".

Once the movement direction is calculated, the movement direction of the base cell 2 and the movement directions of the scan cells 5a and 5b are compared so as to calculate the movement costs. Since the movement direction of the base cell is set to all directions, the diagonal weight is selected with respect to both the scan cells 5a and 5b and the movement costs of the scan cells are set to "2".

The calculated movement cost "2" is compared with the previously stored movement costs of the scan cells 5a and 5b. Since the initial movement cost of the scan cell is set to a maximum value, both the coordinates of the scan cells 5a and 5b shown in FIG. 10 are stored in the queue structure and the scan cells are used as the base cells when the movement information of next cells 6a, 6b and 6c is calculated.

In the robot and the method for planning the path of the robot according to embodiments, it is possible to move the robot to the goal point along the shortest path possible using a grid map including the movement direction and movement cost for moving the robot from the goal point to the searched cell.

The movement direction for moving the robot to the searched cell is calculated and then any one of the diagonal weight, the straight weight and the rotation weight is selected according to the calculated movement direction such that the movement cost is differently calculated. Accordingly, it is possible to build the grid map with higher accuracy as compared to the case of calculating only the movement cost without considering the movement direction.

The obstacle information is updated and recorded in the cell as the robot moves, and the grid map is rebuilt based on the updated obstacle information. Accordingly, it is possible to generate the shortest path capable of avoiding not only obstacles which have been previously recognized but also obstacles which are recognized in real time.

According to an embodiment, movement directions and movement costs of cells in a space in which a robot moves are calculated by a computer. The calculated movement directions and movement costs are used by a computer to build a map of the space.

The embodiments can be implemented in computing hardware and/or software, such as (in a non-limiting example) any computer that can store, retrieve, process and/or output data and/or communicate with other computers. For example, the controller 120 in FIG. 2 can include a computer to perform operations and/or calculations. Moreover, goal point setting unit 121, map builder 122, current position calculator 123, movement path calculator 124 and/or obstacle information updating unit 125 in FIG. 2 may include a computer, or have operations and/or calculations performed by a computer. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.), Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method comprising:
   setting a respective cell of a plurality of cells configuring a space in which a robot moves as a base cell, and storing coordinates of the base cell in a queue structure;
   searching for and setting cells adjacent to the base cell as scan cells;
   for each scan cell,
   calculating, by a computer, a movement direction of the robot from the base cell to the scan cell,
   wherein the movement direction includes a primary movement direction for moving the robot from the base cell to the scan cell, and a secondary movement direction for moving the robot from a cell preceding the base cell to the base cell,
   calculating, by the computer, a movement cost of the scan cell according to the calculated movement direction,
   comparing, by the computer, the calculated movement cost and a movement cost previously stored in the scan cell,
   determining, by the computer, based on said comparing, whether or not coordinates of the scan cell are to be stored in the queue structure and, storing, by the computer, the coordinates of the scan cell in the queue structure if it is determined by said determining that the coordinates are to be stored;

for each cell having coordinates stored in the queue structure,
   setting the respective cell as a base cell and,
   performing said searching and setting, said calculating a movement direction, said calculating a movement cost, said comparing, said determining and said storing, to thereby build a map of the space;

calculating, by the computer, a movement path of the robot based on the built map; and configuring the robot to move along the calculated movement path.

2. The method according to claim 1, further comprising:
updating obstacle information while moving the robot along the calculated movement path.

3. The method according to claim 2, wherein, for each respective scan cell, said comparing, said determining and said storing causes the coordinates of the scan cell to be stored in the queue structure if the calculated movement cost is less than the movement cost previously stored in the scan cell.

4. The method according to claim 1, wherein said performing is repeated until coordinates of the cells configuring the space are not present in the queue structure.

5. The method according to claim 1, wherein the queue structure is of a First-In First-Out (FIFO) type.

6. The method according to claim 1, wherein the movement cost is calculated by selecting any one of a diagonal weight, a straight weight and a rotation weight according to the calculated movement direction and adding the selected weight to the movement cost of the base cell.

7. The method according to claim 6, wherein the weight is selected by comparing a primary movement direction and a secondary movement direction of the scan cell with a primary movement direction and a secondary movement direction of the base cell.

8. The method according to claim 7, wherein the selecting of the weight includes:
selecting the diagonal weight if the primary movement direction of the scan cell coincides with the secondary movement direction of the base cell;
selecting the straight weight if the primary movement direction of the scan cell coincides with the primary movement direction of the base cell; and
selecting the rotation weight if the movement direction of the scan cell does not coincide with the movement direction of the base cell.

9. The method according to claim 1, wherein a goal point of the robot is initially set as the base cell.

10. The method according to claim 9, wherein, if the goal point is set to the base cell, the movement cost of the base cell which is the goal point is set to a predetermined value, the primary movement direction and the secondary movement direction are set to all directions of up, down, left and right, and the set movement cost and movement direction are stored in the cell.

11. The method according to claim 2, further comprising:
determining whether or not an obstacle is present in a cell in which the robot is located while the robot moves and updating obstacle information related to the location of the obstacle; and determining whether or not the map needs to be rebuilt based on the updated obstacle information.

12. The method according to claim 11, wherein the obstacle information includes position information of the obstacle in a cell, and validity information indicating whether or not the position information of the obstacle is valid by directly sensing the obstacle.

13. A robot comprising:
a driving unit configured to move the robot along a movement path;
a sensor configured to sense an obstacle near the robot driven by the driving unit;
a map builder configured to
   set a respective cell of a plurality of cells configuring a space in which the robot moves as a base cell, and store coordinates of the base cell in a queue structure,
   search for and set a plurality of cells adjacent to the base cell as scan cells, for each scan cell,
   calculate a movement direction of the robot from the base cell to the scan cell,
      wherein the movement direction of the robot further comprises a primary movement direction for moving the robot from the base cell to the scan cell, and a secondary movement direction for moving the robot from a cell preceding the base cell to the base cell,
   calculate movement cost of the scan cell according to the calculated movement direction,
   compare the calculated movement cost and a movement cost previously stored in the scan cell,
   determine, based on a result of said compare, whether or not coordinates of the scan cell are to be stored in the queue structure and,
   store the coordinates of the scan cell in the queue structure when it is determined that the coordinates are to be stored, and
for each respective cell having coordinates stored in the queue structure,
   set the respective scan cell as a base cell and,
   perform said search and set, said calculate a movement direction, said calculate movement cost, said compare, said determine and said store to thereby build a map of the space of the robot;
a movement calculator configured to calculate a movement path of the robot based on the map built by the map builder; and
the robot configured to move along the movement path calculated by the movement path calculator.

14. The robot according to claim 13, wherein said compare, said determine and said store cause the map builder to store coordinates of the scan cell in a First-In First-Out queue structure if the calculated movement cost is less than movement cost previously stored in the scan cell.

15. The robot according to claim 13, wherein the map builder builds the map until the coordinates of the cells configuring the space are not present in the queue structure.

16. The robot according to claim 13, wherein the map builder calculates the movement cost of the scan cell by selecting any one of a diagonal weight, a straight weight and a rotation weight according to the calculated movement direction and adding the selected weight to the movement cost of the base cell.

17. The robot according to claim 16, wherein the map builder selects the diagonal weight if the primary movement direction of the scan cell coincides with the secondary movement direction of the base cell, selects the straight weight if the primary movement direction of the scan cell coincides with the primary movement direction of the base cell, and selects the rotation weight if the movement direction of the scan cell does not coincide with the movement direction of the base cell.

18. The robot according to claim 13, further comprising a goal point setting unit configured to set a goal point of the robot, wherein the map builder initially sets the goal point set by the goal point setting unit as the base cell.

19. The robot according to claim 13, further comprising:
    an obstacle information updating unit configured to update obstacle information sensed by the sensor while moving the robot along the movement path calculated by the movement path calculator.

20. The robot according to claim 19, wherein:
    the obstacle information updating unit determines whether or not the map needs to be rebuilt if the obstacle information is updated, and
    the map builder rebuilds the map based on the updated obstacle information if it is determined that the map needs to be rebuilt.

21. The robot according to claim 19, wherein the obstacle information updating unit updates position information of the obstacle in a cell and validity information indicating whether or not the position information of the obstacle is valid by directly sensing the obstacle.

\* \* \* \* \*